(12) United States Patent
Fallahmohammadi et al.

(10) Patent No.: US 11,131,816 B2
(45) Date of Patent: Sep. 28, 2021

(54) OPTICAL FIBER RIBBON ASSEMBLY AND A METHOD OF PRODUCING THE SAME

(71) Applicant: Prysmian S.p.A., Milan (IT)

(72) Inventors: Ehsan Fallahmohammadi, Columbia, SC (US); John R. Sach, Chapin, SC (US); Ben H. Wells, Columbia, SC (US)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 16/629,785

(22) PCT Filed: Jul. 11, 2017

(86) PCT No.: PCT/EP2017/067455
§ 371 (c)(1),
(2) Date: Jan. 9, 2020

(87) PCT Pub. No.: WO2019/011418
PCT Pub. Date: Jan. 17, 2019

(65) Prior Publication Data
US 2021/0141179 A1    May 13, 2021

(51) Int. Cl.
*G02B 6/44* (2006.01)

(52) U.S. Cl.
CPC ........... *G02B 6/4403* (2013.01); *G02B 6/448* (2013.01)

(58) Field of Classification Search
CPC .............................. G02B 6/4403; G02B 6/448
USPC ......................................................... 385/114
See application file for complete search history.

(56) References Cited

U.S. PATENT DOCUMENTS

| 5,682,454 A | 10/1997 | Gaillard |
| 5,720,908 A | 2/1998 | Gaillard |
| 6,381,390 B1 | 4/2002 | Hutton et al. |
| 7,623,747 B2 | 11/2009 | de Montmorillon et al. |
| 7,889,960 B2 | 2/2011 | de Montmorillon et al. |

(Continued)

FOREIGN PATENT DOCUMENTS

| EP | 1043613 A1 | 10/2000 |
| EP | 2770357 A1 | 8/2014 |

(Continued)

OTHER PUBLICATIONS

International Search Report in counterpart International Application No. PCT/EP2017/067455 dated Apr. 19, 2018, pp. 1-2.

(Continued)

*Primary Examiner* — Jerry M Blevins
(74) *Attorney, Agent, or Firm* — Additon, Pendleton & Witherspoon, P.A.

(57) ABSTRACT

The invention relates to an optical fiber ribbon assembly comprising* a plurality of adjacent optical fiber ribbons extending in a longitudinal direction and arranged in a plane, each of the optical fiber ribbons comprising a plurality of optical fibers mutually bonded by a matrix material, the fibers extending in the longitudinal direction and arranged in the plane; said plurality of adjacent ribbons forming at least one set of two adjacent ribbons having an interstice between said two adjacent ribbons and * a bonding material, forming intermittent bonds at the interstice between the two adjacent ribbons of a set, thereby bonding the two adjacent ribbons of the set. The invention also relates to a method of producing such an optical fiber ribbon assembly.

20 Claims, 2 Drawing Sheets

(56) References Cited

U.S. PATENT DOCUMENTS

| | | |
|---|---|---|
| 8,145,025 B2 | 3/2012 | de Montmorillon et al. |
| 8,265,442 B2 | 9/2012 | Overton |
| 8,467,647 B2 | 6/2013 | Wells et al. |
| 8,600,206 B2 | 12/2013 | Overton |
| 9,086,555 B2 | 7/2015 | Namazue et al. |
| 9,389,386 B2 | 7/2016 | Matsuzawa et al. |
| 10,185,105 B2 | 1/2019 | Risch et al. |
| 2003/0002831 A1* | 1/2003 | Chandraiah .......... G02B 6/4404 385/114 |
| 2003/0118301 A1 | 6/2003 | Hurley et al. |
| 2005/0226573 A1* | 10/2005 | Okuno ............... G02B 6/02004 385/114 |
| 2010/0254658 A1 | 10/2010 | Tanaka et al. |
| 2011/0058779 A1 | 3/2011 | Wells et al. |
| 2011/0110635 A1 | 5/2011 | Toge et al. |
| 2013/0156390 A1 | 6/2013 | Matsuzawa et al. |
| 2016/0161692 A1 | 6/2016 | Namazue et al. |
| 2016/0299310 A1 | 10/2016 | Kaneko et al. |
| 2016/0356976 A1 | 12/2016 | Sajima et al. |
| 2017/0115461 A1 | 4/2017 | Namazue et al. |
| 2017/0184803 A1 | 6/2017 | Namazue et al. |
| 2017/0219792 A1* | 8/2017 | Debban ................. G02B 6/448 |
| 2018/0031792 A1 | 2/2018 | Risch et al. |
| 2018/0039035 A1* | 2/2018 | Chiasson ............ G02B 6/4403 |
| 2018/0320003 A1 | 11/2018 | Chen |
| 2018/0371298 A1 | 12/2018 | Schmid et al. |
| 2019/0250347 A1 | 8/2019 | Fallahmohammadi et al. |

FOREIGN PATENT DOCUMENTS

| | | |
|---|---|---|
| FR | 2693560 A1 | 1/1994 |
| JP | 2003-232972 A | 8/2003 |
| JP | 2010-44336 A | 2/2010 |
| JP | 2011-221199 A | 11/2011 |
| JP | 2012-027130 A1 | 2/2012 |
| JP | 2012-103341 A | 5/2012 |
| JP | 2014-010439 A | 1/2014 |
| JP | 2015-021734 A | 2/2015 |
| JP | 2015-108756 A1 | 6/2015 |
| JP | 2016-075746 A | 5/2016 |
| JP | 2017-134360 A | 8/2017 |
| JP | 2017-181513 A | 10/2017 |
| WO | 2012/023508 A1 | 2/2012 |
| WO | 2012/165371 A1 | 12/2012 |
| WO | 2019/011417 A1 | 1/2019 |
| WO | 2019/011418 A1 | 1/2019 |
| WO | 2019/137627 A1 | 7/2019 |
| WO | 2019/137628 A1 | 7/2019 |

OTHER PUBLICATIONS

Loctite Technical Data Sheet, "Loctite 3341", www.henkel.com/industrial, Oct. 2005, pp. 1-4.

DSM Product Data Sheet, "Cableite 9D9-287", Mar. 2007, www.dsmdesotech.com, pp. 1-2.

DSM Product Data Sheet, "Cableite 9D9-464", (no date) pp. 1.

DSM Product Data Sheet, "Cableite 9D9-518", Mar. 2007, Elgin, IL, pp. 1-3.

Loctite Technical Data Sheet, "Loctite SI 5240", www.henkel.com/industrial, Jan. 2015, pp. 1-4.

* cited by examiner

OPTICAL FIBER RIBBON ASSEMBLY AND A METHOD OF PRODUCING THE SAME

TECHNICAL FIELD

The present invention relates to an optical fiber ribbon assembly and to a method of producing the same.

BACKGROUND

The amount of data that is transmitted over optical fiber cables is continuously increasing. This increase is specifically eminent in data centers all over the world—e.g. due to expanding of cloud computing—in which all data has to be transmitted in a limited space. This causes an increasing demand for high-fiber-count and high fiber-density optical cables. Moreover, there is always a tendency to reduce the construction cost of the access cable network, making it important to reduce the diameter and weight of the optical cable. By decreasing optical cable diameter and weight it will be possible to use existing facilities such as underground ducts, which will reduce installation cost. An additional requirement is that in order to shorten the operation time of cable connection, the optical fibers should be mass fusion spliced.

This means that there are several—possibly conflicting—demands, being on the one hand decrease in optical cable diameter and on the other hand increasing the optical fiber density. This is serious challenge for optical cable manufactures.

In order to obtain easy workability, optical fiber ribbons have been used that can be mass fusion spliced for making multiple optical fiber connections at once with improved flexibility.

Standard optical fiber ribbon assemblies, with multiple interconnected optical fiber ribbons, however have the disadvantage of being difficult to split into sub-assemblies, or, component ribbons, having a reduced number of ribbons.

SUMMARY

It is an object of the present invention to provide an optical ribbon which can be made in an efficient manner and having improved properties as to split into component ribbons. It is a further object of the present invention to provide an optical fiber ribbon assembly from which component ribbons can be separated without damaging remaining optical fiber ribbons of the assembly.

One or more of these objects are achieved by an optical fiber ribbon assembly, comprising:
- a plurality of adjacent optical fiber ribbons extending in a longitudinal direction and arranged in a plane, each of the optical fiber ribbons comprising a plurality of optical fibers mutually bonded by a matrix material, the fibers extending in the longitudinal direction and arranged in the plane; said plurality of adjacent ribbons forming at least one set of two adjacent ribbons having an interstice (also called a groove) between said two adjacent ribbons and
- a bonding material, forming intermittent bonds at the interstice between the two adjacent ribbons of a set, thereby bonding the two adjacent ribbons of the set.

In an aspect, the invention relates to a method of producing an optical fiber ribbon assembly, as described above, according to the present invention, said method comprising:
- feeding a plurality of optical fiber ribbons to provide a longitudinal optical fiber ribbon assembly; wherein the plurality of optical fiber ribbons extend in a longitudinal direction, in a plane and adjacent to each other, each of the optical fiber ribbons comprising a plurality of optical fibers mutually bonded by a matrix material, said plurality of adjacent ribbons forming at least one set of two adjacent ribbons having an interstice between said two adjacent ribbons;
- applying a material for bonding from a dispenser to a surface of said assembly, in such a manner that it forms, after curing and/or cooling, a bonding material forming intermittent bonds between the two adjacent ribbons of a set, at the interstice between the two adjacent ribbons.

Corresponding embodiments of the ribbon assembly disclosed below are also applicable for the method according to the present invention and vice versa.

The optical fiber ribbon assembly and method according to the present invention thus combine the strength and the ability of mass fusion splicing of ribbons with flexibility to allow the production of a cable having a high fiber density, while making it possible to easily split the ribbon assembly into component ribbons without damaging remaining optical fiber ribbons of the assembly. The inventive ribbon assembly is very flexible and it is therefore also effective for dense packing of the optical fiber ribbons within an optical fiber cable to give a high fiber density. The ribbon assembly can be spliced at once with mass fusion splicing and individual optical fiber ribbons can be separated from the ribbon assembly easily.

Within the scope of the present teachings a bond means a bead of bonding material that bonds two adjacent optical fiber ribbons over a bonding length (l).

BRIEF DESCRIPTION OF DRAWINGS

The present invention is described hereinafter with reference to the accompanying schematic drawings in which embodiments of the present invention are shown and in which like reference numbers indicate the same or similar elements.

DESCRIPTION OF EMBODIMENTS

Figure 1:
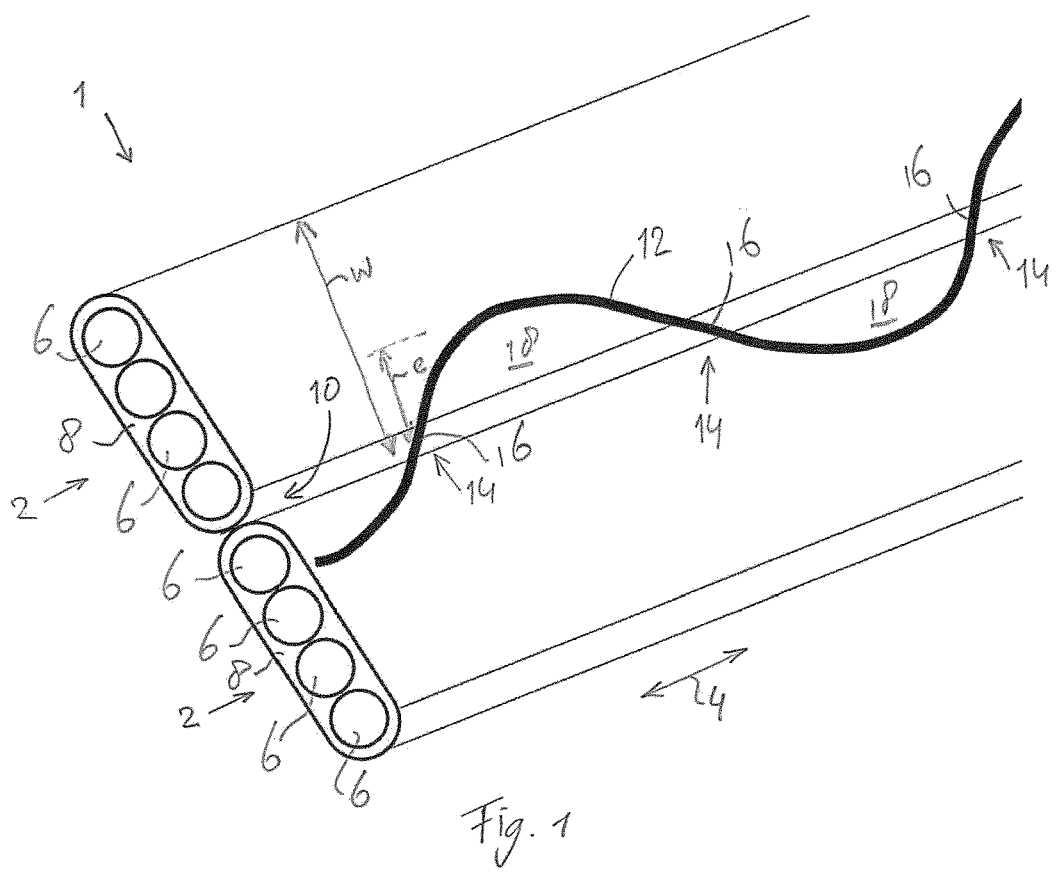
FIG. 1 shows an embodiment of an inventive optical fiber ribbon assembly.

As described above, in a first aspect the invention relates to an optical fiber ribbon assembly. Several embodiments of said assembly are discussed below.

In an embodiment, the bonding material of the optical fiber ribbon assembly is present in the interstice and, outside the interstice, it only extends in respective adjacent edge zones of the two adjacent ribbons of the set, wherein an edge zone is defined as the zone comprising at most 30 percent, preferably at most 25 percent, for example between 10 and 25 percent, of the width of the ribbon in transverse direction. As a result, a high flexibility is obtained, with an optimal use of bonding material.

In an embodiment, the two adjacent ribbons of the set have been bonded by the bonding material on only one side of the assembly. With only on one side is meant only on the top or bottom side when the ribbon assembly is seen in plan view. This allows the bonding material to form a flexible, bendable bond that allows folding of the ribbon assembly for example to fit inside a cable. As a result, a high flexibility is obtained.

In an embodiment, the bonding material is in the form of a thread, wherein one thread has been provided for each set of two adjacent ribbons, said thread being arranged along a length of said assembly, extending only over the two adjacent ribbons of the set, and such that the thread forms multiple crossings over the interstice between the two adjacent ribbons, the thread at each crossing forming a bond, of the intermittent bonds, between the two adjacent ribbons. This form of bonding material enables an efficient manner of manufacturing of the ribbon assembly.

In an embodiment, the thread follows a wave-shaped path or a cycloid-shaped path over the two adjacent ribbons of the set. As a result, the crossings forming the bonds may be efficiently be made.

In an embodiment, at crossings, the thread follows the interstice over a bonding length.

In an embodiment the optical fiber ribbon assembly comprises only two ribbons.

In an embodiment, said matrix material is an acrylate, such as an polyurethane acrylate or a polymethacrylate material. In an embodiment, the encapsulating matrix material has a thickness of between 5 and 10 micrometer.

In an embodiment, the thread has a mass (in grams) per 10000 m of between 60 and 120 dtex, preferably between 75 and 110 dtex.

In an embodiment of the method,
applying a material for bonding from a dispenser to a surface; comprises (or consists of)
applying a material for bonding from the dispenser to the surface of said assembly in the form of a thread, wherein the material for bonding, for each set of two adjacent ribbons, is applied to extend only over the set of two adjacent ribbons such that the thread forms multiple crossings over the interstice between the two adjacent ribbons of the set, the thread at each crossing, after curing and/or cooling, forming a bond, of the intermittent bonds, between the two adjacent ribbons.

In an embodiment of the method,
applying a material for bonding from a dispenser to a surface; comprises (or consists of) the following steps:
applying a material for bonding in the form of a curable resin from the dispenser to the surface of said assembly (3) wherein the curable resin is applied such that it forms the intermittent bonds after curing; and
passing said assembly (3) with the material for bonding applied thereon through a curing station for curing the resin to form said bonds of cured resin.

The curable resin may have a viscosity at 23° C. of between 200 and 2000 cPS, preferably between 300 and 1000 cPS and more preferably between 400 and 600 cPS.

The curing station may emit Ultra Violet (UV) or Electron Beam (EB) radiation for curing said curable resin.

In an alternative method,
applying a material for bonding from a dispenser to a surface; comprises the following step:
providing a material for bonding, being a thermoplastic material, from the dispenser and heating said thermoplastic material to above its softening point and applying said softened thermoplastic material to said surface of said assembly (3) wherein the softened thermoplastic material is cooled down and forms the intermittent bonds of said thermoplastic material.

Cooling of the thermoplastic material may be obtained by e.g. transporting the fiber ribbon assembly over cold sheaves.

In an embodiment of the method according to the present invention, the dispenser may be rotating in a plane parallel to the plane of the assembly, or oscillating in a direction transverse to the longitudinal direction of the optical fiber ribbon assembly.

In case of a rotating dispenser, a cycloid shaped path may be created. Depending on the speed of movement of the ribbon assembly past the dispenser and depending on the rotational speed of the dispenser, an ordinary cycloid shape, a curtate cycloid shape, or a prolate cycloid shape path may be realized.

Preferably the softening point of said thermoplastic thread is above 120° C. The softening point is determined according Vicat method with a load of 10N, according ASTM-D1525-09. After heating the thermoplastic thread is cooled down, e.g. by transporting the ribbon assembly over cold sheaves.

FIG. 1 shows an optical fiber ribbon assembly 1, or at least a part thereof. The Assembly 1 comprises two adjacent optical fiber ribbons 2 extending in a longitudinal direction 4 and arranged in a plane, at least in a folded out state of the assembly 1. That is, they are flush with respect to each other. Alternatively more adjacent optical fiber ribbons may be used, such as three or four or more such as ranging from five to ten ribbons. The latter also holds for the other assemblies 100, 200 which will be discussed below.

Each of the optical fiber ribbons 2 comprises four optical fibers 6 mutually bonded by an acrylate matrix material 8. The encapsulating matrix material 8 has a thickness of between 5 and 10 micrometer. Alternatively less or more optical fibers per ribbon may be used, such as two or three or more than four such as ranging from five to 40 fibers, preferably 12 fibers. The latter also holds for the other assemblies 100, 200 which will be discussed below.

The fibers 6 extend in the longitudinal direction 4 and are also arranged in the plane. The two adjacent ribbons 2 form a set (of the two adjacent ribbons 2) having an interstice 10 between the two adjacent ribbons 2. At the interstice 10, the ribbons are in contact with each or may leave a very small gap in between the ribbons, with a gap width in the order of a few micrometers.

The optical fiber ribbon assembly 1 also comprises a bonding material. The bonding material is in the form of a thread 12. The thread 12 extends over the two adjacent ribbons 2 of the set following a wave-shape path, and such that the thread 12 forms multiple crossings 14 over the interstice 10 between the two adjacent ribbons 2. The thread 12 forms a bond 16 between the two adjacent ribbons 2 at each crossing 14. The reference sign 16 is thus used for the part of the thread 12 at a crossing, forming a bond. Seen in the longitudinal direction, the bonding material in the form of the thread 12 thus forms intermittent bonds 16 at the interstice 10 between the two adjacent ribbons 2, thereby bonding the two adjacent ribbons. The two adjacent ribbons 2 of the set have been bonded by the bonding material in the form of the thread 12 on only one side of the assembly 1, by which is meant only the top side as visible in FIG. 1.

Figure 3:
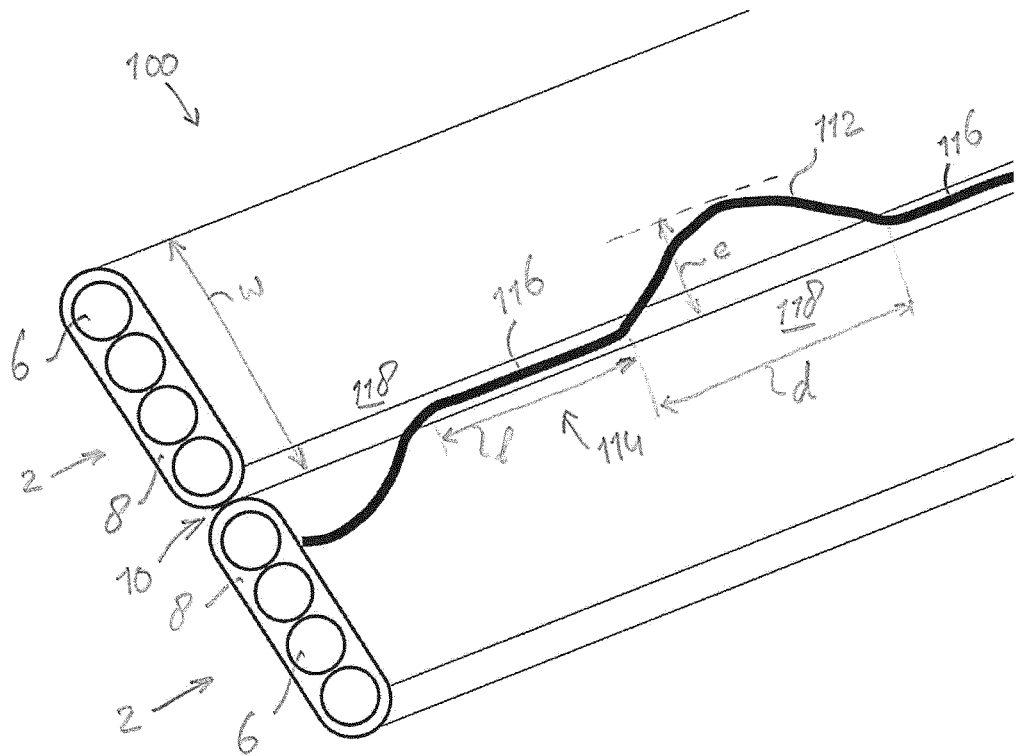
FIG. 3 shows a still further embodiment of an inventive optical fiber ribbon assembly.

FIG. 3 shows an optical fiber ribbon assembly 100 being another embodiment of an optical fiber ribbon assembly according to the present teachings. The assembly 100 is identical to the assembly of FIG. 1 except for the material of the thread—although the material may be the same—and the path of the thread. Features which are identical are given the same reference signs, while features having the same function are given a reference sign to which 100 has been added.

Figure 4:
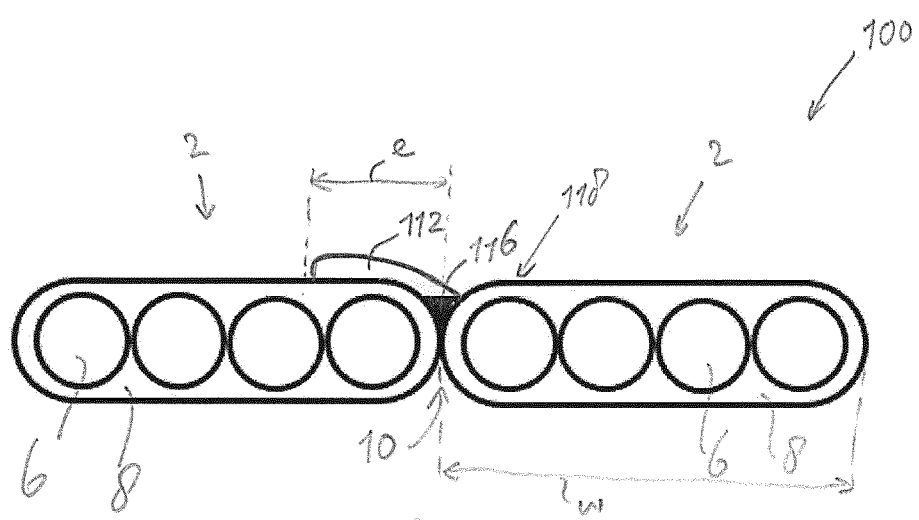
FIG. 4 shows section IV-IV according to FIG. 3.

The thread 112 of the assembly 100 also follows a wave-shaped path but, contrary to the embodiment of FIG. 1, at crossings 114, the thread follows the interstice 10 over a bonding length (l) and thereby forms a bond 116 having a bonding length l ranging from 2 to 250 millimeter. The bonds 116 form intermittent bonds between the two ribbons 2 of the assembly 100, at a mutual distance d between two adjacent bonds 116 in the same range of 2 to 250 millimeter. Preferably, l is in the same order as d, that is, if l is in the order of tens of millimeters, then d is also in the order of tens of millimeters. The two adjacent ribbons 2, like the ribbons of FIG. 1, have been bonded by thread 12 on only one side of the assembly 100. See also FIG. 4, in which figure is shown that the bonding material in the form of the thread 112 is only present on the top side, that means upper side in the view of FIG. 4, of the assembly 100.

In an embodiment, the bonding material has a elongation at break of at least 150%, preferably at least 175%, more preferably at least 200%, even more preferably at least 220% and an modulus of elasticity (or Young's modulus) of between 10 and 16 MPa. In the present invention elongation at break and modulus of elasticity was measured using the following method: ASTM D882-12 "Standard Test Method for Tensile Properties of Thin Plastic Sheeting".

In an embodiment, the bonding material is a cured resin or a thermoplastic material.

In an embodiment the cured resin is an acrylate resin. Said cured resin is obtained by the curing of a curable, preferably UV curable resin, that is applied in the form of the thread.

In an embodiment the thermoplastic material is selected from the group consisting of nylon, copolyamide, polyester and copolyester.

In an embodiment, the thermoplastic material has a melting point of between 55 and 170° C., such as between 60 and 150° C., for example between 120 and 150° C.

As shown in FIGS. 1 and 3, the bonding material is present in the interstice 10 and, outside the interstice 10, it only extends in respective adjacent edge zones 18, 118 of the two adjacent ribbons 2. The edge zones 18, 118 are defined as the zones having a width e of at most 30 percent of the width w of the ribbon, the width being in transverse direction, transverse to the longitudinal direction 4.

Figure 2:
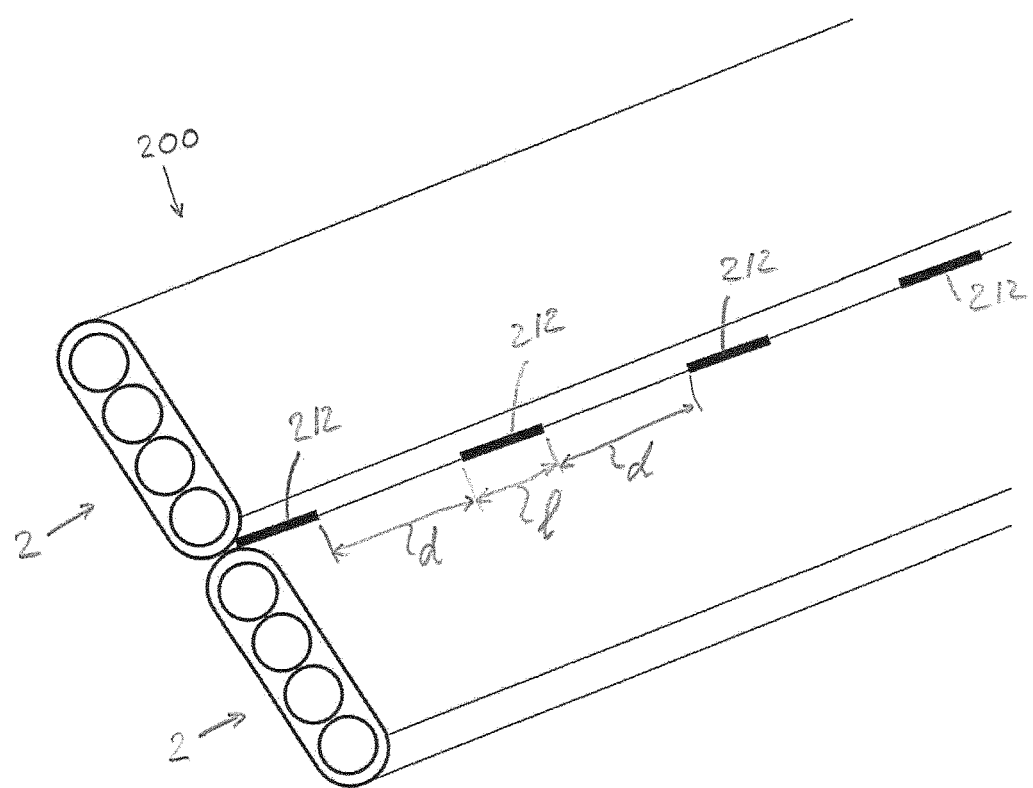
FIG. 2 shows a further embodiment of an inventive optical fiber ribbon assembly.

FIG. 2 shows an optical fiber ribbon assembly 200 being another embodiment of an optical fiber ribbon assembly according to the present teachings. The assembly 200 is identical to the assembly of FIGS. 1 and 3 except for the bonding material. The assembly 200 does not have a bonding material in the form of a thread. Instead, it has successive pieces 212 of bonding material only in the interstice 10, the pieces 212 forming successive, intermittent bonds between the two ribbons 2 of the assembly 200. The bonds, formed by the pieces 212, each have a bonding length l. Adjacent pieces 212 are disposed at a distance d.

A method of producing the optical fiber ribbon assembly 1 as described above, comprises the step of feeding the two optical fiber ribbons 2; wherein the two optical fiber ribbons 2 extend in the longitudinal direction 4, in a plane and adjacent to each other. The two ribbons form a set, having the interstice 10 between the two adjacent ribbons 2.

The method further comprises the step of applying a material for bonding in the form of a curable resin from a dispenser to a surface of said ribbons 2. The curable resin has a viscosity at 23° C. of between 400 and 600 cPS. The material for bonding is applied in a continuous manner and such that it follows a wave-shaped path as shown in FIG. 1.

As a result it forms, after curing, the bonding material 12 forming the intermittent bonds 16 between the two adjacent ribbons 2 of the set, at the interstice 10 between the two adjacent ribbons 2.

Next, the method comprises the step of passing said set of ribbons 2 with the material for bonding applied thereon through a curing station for curing the resin to form said bonds 16 of cured resin. The curing station emits Ultra Violet (UV) or Electron Beam (EB) radiation for curing said curable resin.

The alternative method of producing the optical fiber ribbon assembly 100 also comprises the step of feeding the two optical fiber ribbons 2 as described above. Next, the material for bonding is continuously applied from a dispenser to a surface such that it follows the wave-shaped path on the ribbons 2. To that end, the material for bonding, being a thermoplastic material, is provided from the dispenser and heated to above its softening point. Said softened thermoplastic material is applied to said surface of said assembly wherein the softened thermoplastic material is cooled down and forms the intermittent bonds of said thermoplastic material.

In order to create the wave-shaped path of the bonding material of assemblies 1 and 100, for the purpose of the step of applying a material for bonding, the dispenser may be oscillating in transverse direction above the set of ribbons 2, while the ribbons move in the longitudinal direction underneath the dispenser. As a result, the wave-shaped path is created, having an amplitude which depends on the extent of the transverse reciprocal movement and having a frequency which depends on the longitudinal speed of movement of the ribbons. Using this method, a sinusoidal path may be created, for example.

The path of the assembly of FIG. 3 may be realized by each time shortly interrupting the reciprocal movement of the dispenser at the transverse position of the interstice, for example. A path like the path shown in FIG. 3 may also arise as a result of the geometry of the end zones of ribbons and thus of the interstice. The rounded edges of the ribbons defining the interstice may have the effect that the material for bonding "sinks" into the interstice as soon as the dispenser moves over the start of the rounded edge—that means the transition of the substantially flat upper side of the ribbon to the rounded edge of that ribbon—of one of the ribbons. The material for bonding only leaves the interstice when the dispenser moves over the start of the rounded edge of the other ribbon of the set. The degree of this "sinking" into the interstice, or "sticking" in the interstice depends among others on the viscosity of the material for bonding and of the friction between the outer surface of the ribbon and the bonding material.

In another embodiment of the method, for the purpose of the step of applying a material for bonding, the dispenser may be rotating parallel to the plane of the set of ribbons, above the set of ribbons 2, while the ribbons move in the longitudinal direction underneath the dispenser. As a result, a cycloid-shaped path is created.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The scope of the present invention is defined by the appended claims. One or more of the objects of the invention are achieved by the appended claims.

The invention claimed is:

1. An optical fiber ribbon assembly (1), comprising:
   (i) a plurality of adjacent optical fiber ribbons (2) extending in a longitudinal direction (4) and arranged in a plane, each of the optical fiber ribbons (2) comprising a plurality of optical fibers (6) mutually bonded by a matrix material (8), the optical fibers extending in the longitudinal direction and arranged in the plane, said plurality of adjacent ribbons (2) forming at least one set of two adjacent ribbons (2) having an interstice (10) between said two adjacent ribbons (2); and
   (ii) a bonding material forming intermittent bonds at the interstice between the two adjacent ribbons of a set, thereby bonding the two adjacent ribbons of the set, wherein the bonding material is in the form of a thread (12), wherein one thread (12) is provided for each set of two adjacent ribbons (2), said thread (12) being arranged along a length of said assembly and extending only over the two adjacent ribbons of the set such that the thread (12) forms multiple crossings (14) over the interstice (10) between the two adjacent ribbons, the thread at each crossing forming a bond, of the intermittent bonds, between the two adjacent ribbons.

2. The optical fiber ribbon assembly (1) according to claim 1, wherein the bonding material is present in the interstice and, outside the interstice, the bonding material extends only in respective adjacent edge zones (18) of the two adjacent ribbons of the set, wherein an edge zone is defined as the zone comprising at most 30 percent of the width (w) of the ribbon in transverse direction.

3. The optical fiber ribbon assembly (1) according to claim 1, wherein the two adjacent ribbons of the set are bonded by the bonding material on only one side of the assembly (1).

4. The optical fiber ribbon assembly (1) according to claim 1, wherein the thread (12) follows a wave-shaped path or a cycloid-shaped path over the two adjacent ribbons (2) of the set.

5. The optical fiber ribbon assembly (1) according to claim 1, wherein, at crossings, the thread follows the interstice (10) over a bonding length (l).

6. The optical fiber ribbon assembly (1) according to claim 1, comprising only two ribbons (2).

7. The optical fiber ribbon assembly (1) according to claim 1, wherein the bonding material has an elongation at break of at least 150 percent and a modulus of elasticity of between 10 and 16 MPa.

8. The optical fiber ribbon assembly (1) according to claim 1, wherein the bonding material is a cured resin or a thermoplastic material.

9. A method of producing an optical fiber ribbon assembly (1), comprising:
   (i) feeding a plurality of optical fiber ribbons (2), wherein the plurality of optical fiber ribbons (2) extend in a longitudinal direction, in a plane, and adjacent to each other, each of the optical fiber ribbons (2) comprising a plurality of optical fibers mutually bonded by a matrix material (8), the optical fibers extending in the longitudinal direction and arranged in the plane, said plurality of adjacent ribbons (2) forming at least one set of two adjacent ribbons (2) having an interstice (10) between said two adjacent ribbons (2); and
   (ii) applying a material for bonding from a dispenser (14) in the form of a corresponding thread (12) to a surface of a first set of two adjacent ribbons (2) having an interstice (10) between the two adjacent ribbons (2) in such a manner that the material for bonding forms, after curing and/or cooling, a bonding material forming intermittent bonds at the interstice between the two adjacent ribbons of the first set, wherein the material for bonding, for each set of two adjacent ribbons (2), is applied to extend only over the two adjacent ribbons (2) such that the corresponding thread (12) forms multiple crossings over the interstice (10) between the two adjacent ribbons of the set, the thread at each crossing, after curing and/or cooling, forming a bond, of the intermittent bonds, between the two adjacent ribbons.

10. The method according to claim 9, wherein applying a material for bonding from a dispenser to a surface, comprises the following steps:
   applying a material for bonding in the form of a curable resin from the dispenser to the surface of said first set of two adjacent ribbons (2) wherein the curable resin is applied such that it forms the intermittent bonds after curing; and
   passing said adjacent ribbons (2) with the material for bonding applied thereon through a curing station (16) for curing the resin to form said bonds of cured resin.

11. The method according to claim 10, wherein the curable resin has a viscosity at 23° C. of between 200 and 2000 cPS.

12. The method according to claim 10, wherein the curing station emits ultraviolet (UV) or Electron Beam (EB) radiation for curing said curable resin.

13. The method according to claim 9, wherein applying a material for bonding from a dispenser to a surface comprises:
   providing a thermoplastic material for bonding from the dispenser, heating said thermoplastic material to above its softening point, applying said softened thermoplastic material to said surface of said first set of two adjacent ribbons (2), and cooling the softened thermoplastic material to form the intermittent bonds of said thermoplastic material.

14. The method according to claim 9, wherein the dispenser rotates in a plane parallel to the plane of the optical fiber ribbon assembly or oscillates in a direction transverse to the longitudinal direction of the optical fiber ribbon assembly.

15. A method of producing an optical fiber ribbon assembly (1), comprising:
   (i) feeding a plurality of optical fiber ribbons (2), wherein the plurality of optical fiber ribbons (2) extend in a longitudinal direction, in a plane, and adjacent to each other, each of the optical fiber ribbons (2) comprising a plurality of optical fibers mutually bonded by a matrix material (8), the optical fibers extending in the longitudinal direction and arranged in the plane, said plurality of adjacent ribbons (2) forming at least one set of two adjacent ribbons (2) having an interstice (10) between said two adjacent ribbons (2); and
   (ii) applying a material for bonding from a dispenser (14) to a surface of a first set of two adjacent ribbons (2) having an interstice (10) between the two adjacent ribbons (2) in such a manner that the material for bonding forms, after curing and/or cooling, a bonding material forming intermittent bonds at the interstice between the two adjacent ribbons of the first set, wherein the dispenser rotates in a plane parallel to the plane of the optical fiber ribbon assembly or oscillates in a direction transverse to the longitudinal direction of the optical fiber ribbon assembly.

16. The method according to claim 15, wherein applying a material for bonding from a dispenser to a surface, comprises the following steps:
- applying a material for bonding in the form of a curable resin from the dispenser to the surface of said first set of two adjacent ribbons (2) wherein the curable resin is applied such that it forms the intermittent bonds after curing, wherein the curable resin has a viscosity at 23° C. of between 200 and 2000 cPS; and
- passing said adjacent ribbons (2) with the material for bonding applied thereon through a curing station (16) for curing the resin to form said bonds of cured resin, wherein the curing station emits ultraviolet (UV) or Electron Beam (EB) radiation for curing said curable resin.

17. An optical fiber ribbon assembly (1), comprising:
(i) a plurality of adjacent optical fiber ribbons (2) extending in a longitudinal direction (4) and arranged in a plane, each of the optical fiber ribbons (2) comprising a plurality of optical fibers (6) mutually bonded by a matrix material (8), the optical fibers extending in the longitudinal direction and arranged in the plane, said plurality of adjacent ribbons (2) forming at least one set of two adjacent ribbons (2) having an interstice (10) between said two adjacent ribbons (2); and
(ii) a bonding material forming intermittent bonds at the interstice between the two adjacent ribbons of a set, thereby bonding the two adjacent ribbons of the set, wherein the two adjacent ribbons of the set are bonded by the bonding material on only one side of the assembly (1).

18. The optical fiber ribbon assembly (1) according to claim 17, wherein the bonding material is present in the interstice and, outside the interstice, the bonding material extends only in respective adjacent edge zones (18) of the two adjacent ribbons of the set, wherein an edge zone is defined as the zone comprising at most 30 percent of the width (w) of the ribbon in transverse direction.

19. The optical fiber ribbon assembly (1) according to claim 17, wherein the bonding material has an elongation at break of at least 150 percent and a modulus of elasticity of between 10 and 16 MPa.

20. The optical fiber ribbon assembly (1) according to claim 17, wherein the bonding material is a cured resin or a thermoplastic material.

\* \* \* \* \*